Figure 1:
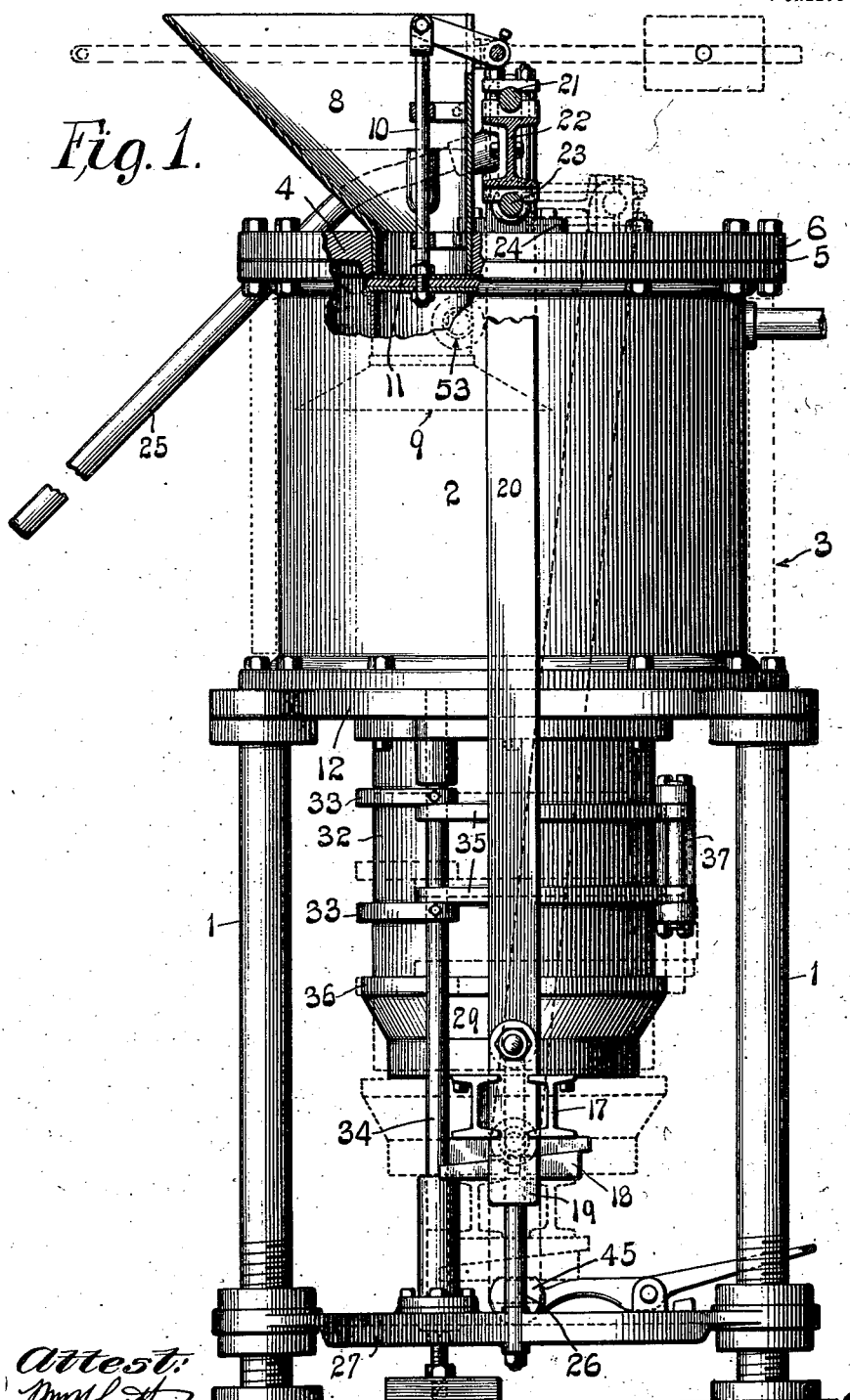

J. H. RIVERS.
PROCESS OF COMPACTING AND DRYING PULP.
APPLICATION FILED JULY 26, 1909.

1,174,447.

Patented Mar. 7, 1916.
4 SHEETS—SHEET 1.

Attest:

Inventor
Julian H. Rivers.

J. H. RIVERS.
PROCESS OF COMPACTING AND DRYING PULP.
APPLICATION FILED JULY 26, 1909.

1,174,447.

Patented Mar. 7, 1916.
4 SHEETS—SHEET 2.

Inventor.
Julian H. Rivers

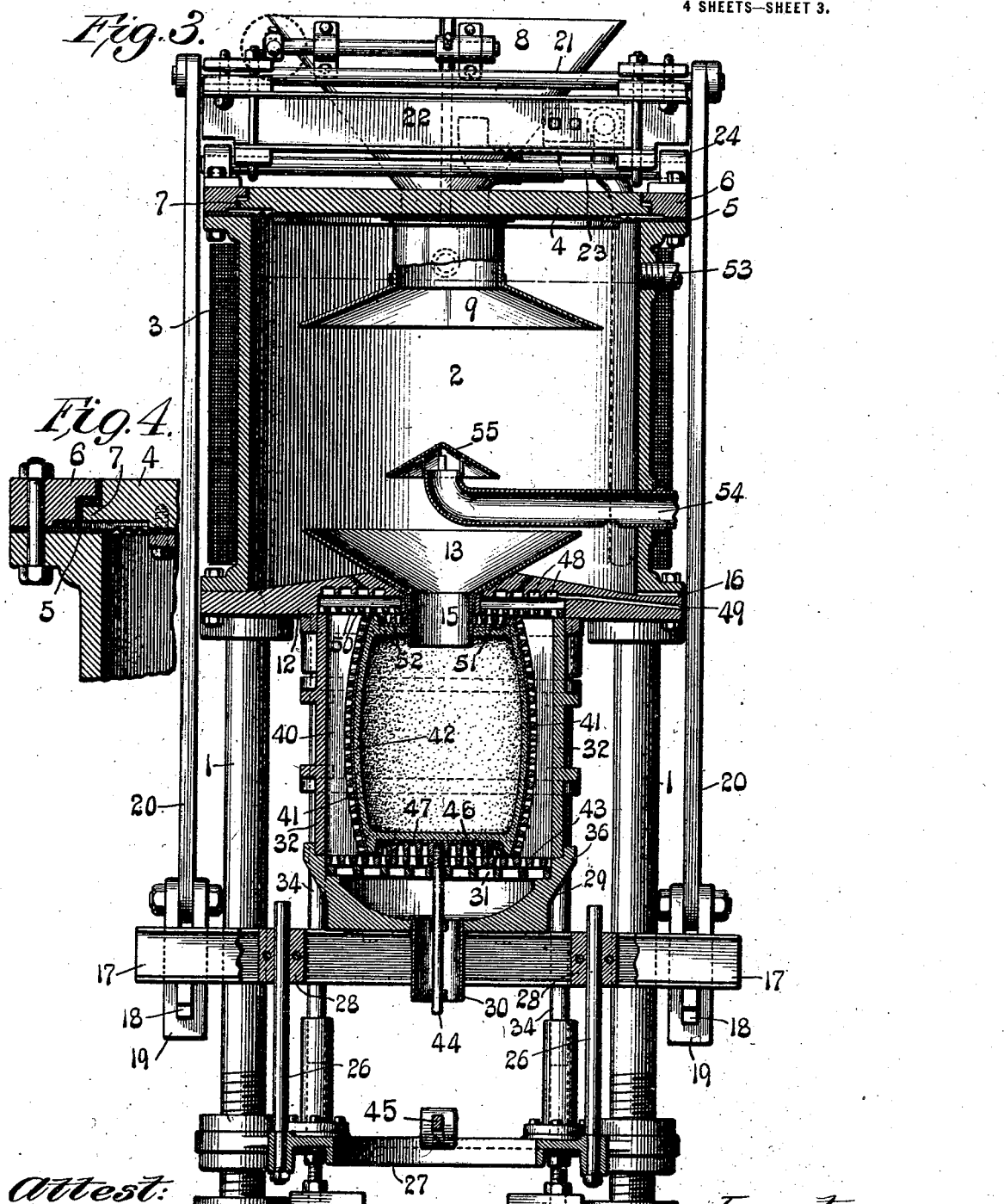

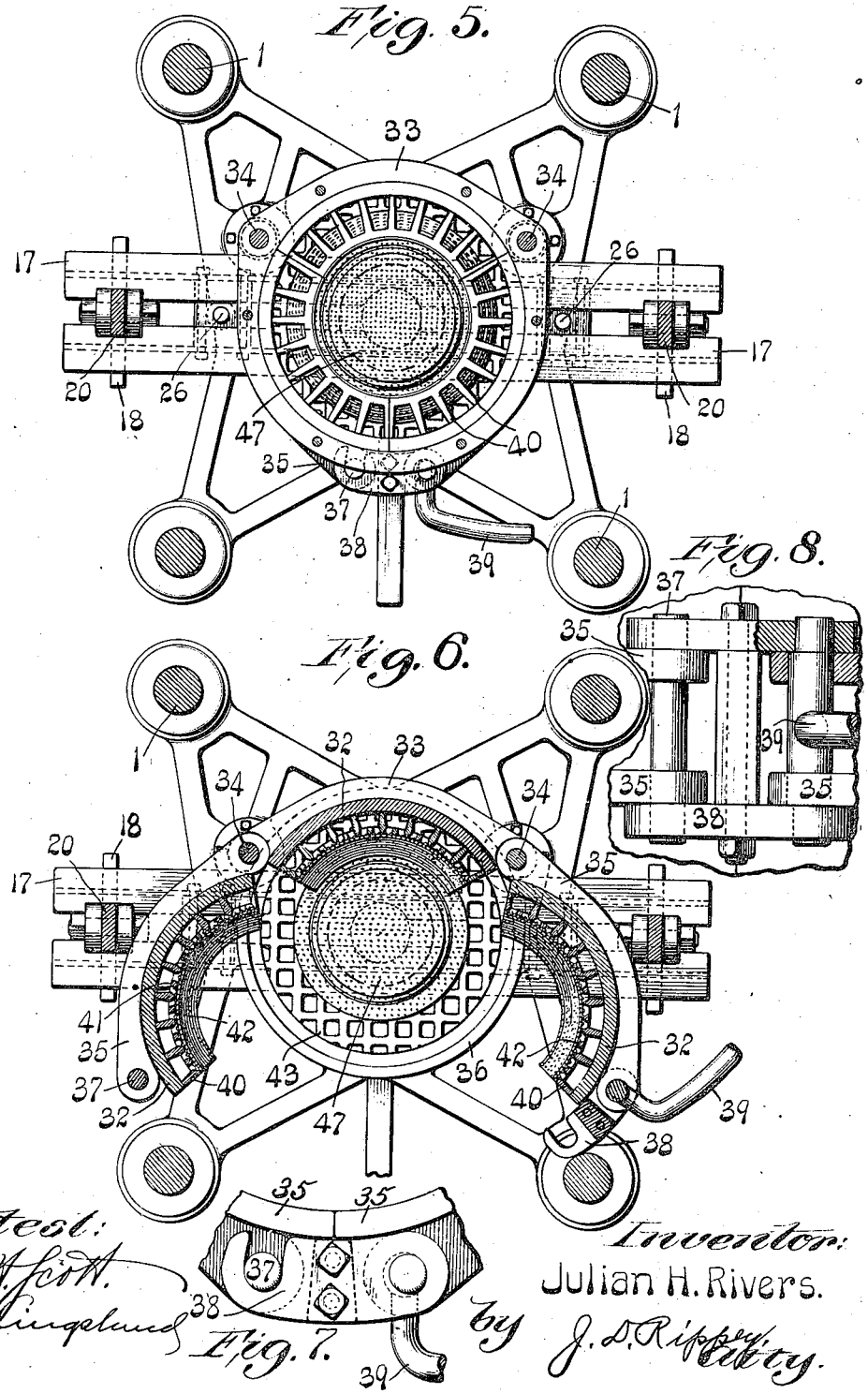

UNITED STATES PATENT OFFICE.

JULIAN H. RIVERS, OF ST. LOUIS, MISSOURI, ASSIGNOR, BY MESNE ASSIGNMENTS, TO UNIVERSAL FIBRE COMPANY, OF NEW YORK, N. Y., A CORPORATION OF DELAWARE.

PROCESS OF COMPACTING AND DRYING PULP.

1,174,447. Specification of Letters Patent. Patented Mar. 7, 1916.

Application filed July 26, 1909. Serial No. 509,472.

*To all whom it may concern:*

Be it known that I, JULIAN H. RIVERS, a citizen of the United States, residing at St. Louis, Missouri, have invented a new and useful Process of Compacting and Drying Pulp, of which the following is a specification.

This invention relates to a process for compacting and drying pulp, and has for its object a process whereby it is possible to mold and immediately dry objects in the mold and by such drying avoid handling, and by the contact of the mold and the object therein prevent warping and reduce shrinkage of the object to the minimum.

In its specific features the present invention consists of an advance and improvement upon the invention disclosed in my former Patent No. 804,432 of November 14, 1905, in which the objects were molded and immediately removed for subsequent treatment and drying. In that process the materials to be molded include essentially more or less pulp, and are thoroughly diffused and suspended in water within a container which opens into the "former" or mold, whereby the suspended and diffused materials were molded. By that process, application of pressure of 80 pounds or more produces finished objects in which the pulp and other materials approximately balance in weight the retained water and moisture. The object thus formed, while cohesive in its construction, contained so much moisture that the materials could not be thoroughly bonded and united, and the removal of the object from the "former" or mold involving handling would cause defacement and marring of the surface of the object.

In the present instance I provide an improved machine the operation of which includes the use of hot air or superheated steam to propel the materials against the walls of the "former" or mold and to eject the liquid. This heated air or steam being forced through the molded material ejects the moisture from, and completes the bonding of, the materials without warping. It also prevents shrinkage of the object for the reason that heated air or steam is applied to the interior surface of the object under pressure while the object is still in the "former" or mold. This process properly conducted requires but little more time than the operation of molding alone.

The construction of the machine is such that the vapor which rises in the container and the moisture which adheres to the walls thereof is, to a large extent, deflected from entering the molded object, thereby enabling the drying operation to proceed without the addition of moisture in material quantities.

Another advance and departure from the invention as disclosed in my former patent referred to, is found in the arrangement of the "former" or mold and the method in which the water is ejected therethrough. In the present instance the "former" or mold is inclosed within a compartment, and the material diffused in liquid is admitted into the mold through a passage somewhat larger than the outlet passage. While the water and diffused material are entering the container, a portion of the water enters the "former" or mold, passing through the same and depositing against the interior walls thereof an advance or primary layer of the fibrous and other materials. From the mold the water enters the inclosing chamber, completely immersing the latter, and from said chamber outwardly through an outlet somewhat smaller than the passage leading from the container into mold, which arrangement maintains an inclosing water jacket around the mold until all of the material bearing liquid has entered the mold and the final quantities are being driven out. This assists in maintaining an even deposit of the material against the interior of the mold or "former" and prevents the formation of holes and irregularities which frequently result from the application of high pressure when there is no retaining jacket inclosing the mold.

Involving these and other improved features, the machine containing an embodiment of my present invention is illustrated in the accompanying drawings in which—

Figure 2:
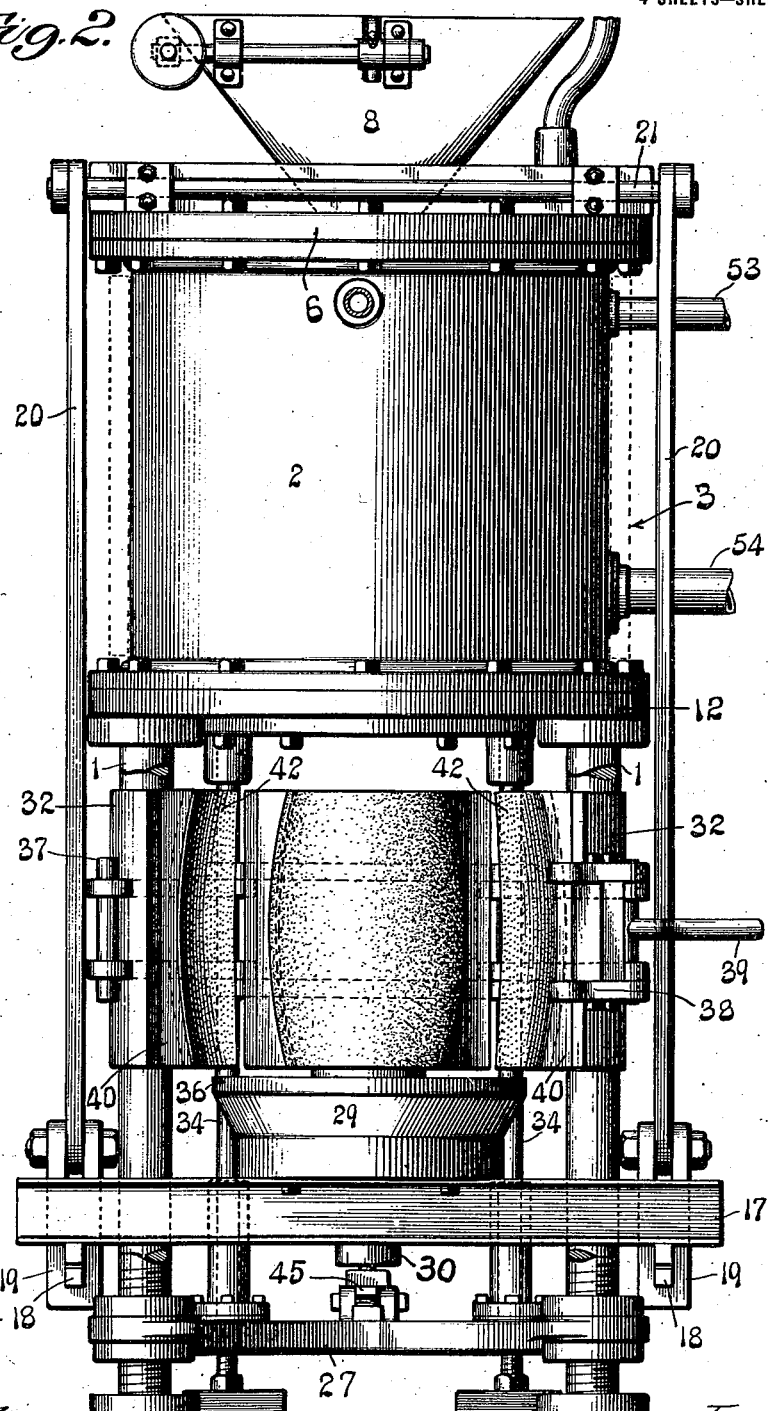

Figure 1 is an elevation of the complete machine, a portion of the upper part thereof being in section. Fig. 2 is a front elevation of the machine with the "former" or mold opened to permit the removal of the completed object. Fig. 3 is a vertical sectional view of the complete machine. Fig. 4 is a detail sectional view of a portion of the top showing the construction thereof. Fig. 5 is a plan view of the "former" or mold and its supporting and elevating frames. Fig. 6 is a sectional view thereof with the mold sections drawn apart. Fig. 7 is a detailed view of the locking device whereby the mold sections are held in closed position. Fig. 8 is a front elevation of the locking devices whereby the mold sections are held closed.

The machine comprises a supporting frame 1 carrying a container or tank 2, preferably inclosed by an electric heating jacket 3 whereby the tank and contents may be maintained at uniform temperature. A top plate 4 is connected to the inner edge of the thin corrugated annular metallic plate 5 the outer edge of which is secured to the tank or container by a ring 6 bolted firmly to an exterior flange on the tank. The plate 4 has an exterior flange 7 projecting into a groove or channel in the under side of the ring 6 whereby the top plate will be firmly held against undue displacement when high pressure is admitted into the tank. A hopper 8 opens through the top 4 and affords means for supplying the liquid and liquid borne materials thereto. A truncated cone-shaped valve 9 is supported within the container by a rod 10 and is provided with a gasket 11 on its upper end arranged to contact with the interior surface of the top plate around the opening of the hopper 8 and hermetically close the same when the pressure is admitted into the container. The bottom of the container 2 comprises a plate 12 which slopes outwardly from the center and a hopper 13 supported by the said plate and having a tubular extension 15 depending therefrom. The edges of the cone of the valve 9 project laterally beyond the edges of the hopper 13 whereby any moisture which may have gathered upon the surface of said cone and on the interior of the top plate 4 after the water and materials have passed from the container tube, will be caused to drip into the space outside of the hopper 13 and thereby be prevented from entering the mold or "former" with which said last named hopper communicates. From the space surrounding the hopper 13 the liquid may be drained off through an outlet 16 so that there will be no opportunity for the liquid contained in said space to rise above the edges of the hopper 13 and thereby enter the mold.

Two bars 17 are carried horizontally upon adjustable wedge block 18 supported in brackets 19 which are pivoted to the lower ends of links 20 at opposite sides of the machine. The upper ends of the links 20 are pivoted to a rod 21 supported by a suitable frame 22, said frame being pivoted to a rod or shaft 23 which is supported in bearings 24 attached to the upper surface of the top plate 4. An operating lever 25 attached to the frame 22 affords means for moving the frame manually to different positions as shown by dotted lines in Fig. 1, whereby the bars 17 will be raised or lowered as desired. Said bars are guided vertically by rods 26 rigidly attached to the lower frame part 27 and extending through holes in guide blocks 28 bolted between the bars 17. A hopper 29 is attached to the bars 17 and has sloping interior walls leading toward the center thereof from which a pipe 30 opens to the exterior. A grate 31 covers the hopper 29. The said hopper supports an inclosure comprising a series of arcuate plates 32, one of which has ribs 33 provided with holes through which the two rods 34 attached to the bottom plate 12 and to the frame 27, extend. Two other arcuate plates 32 have ribs 35 and are hinged to the rods 34 and may be swung to open or closed position as shown in Figs. 5 and 6. The lower edges of the plates 32 in closed position are embraced by a flange 36 on the hopper 29 whereby the inclosure will be firmly held in closed position even under pressure applied from the interior. The ribs 35 on one of the hinged plates 32 carry a rod 37. The ribs 35 on the other hinged plate 32 carry latches 38 operable by a handle 39 to engage with the rod 37 when said plates 32 are in closed position and assist in holding the inclosure in proper position. Each of the plates 32 carries a series of vertical members 40 to which are attached the frames or backing plates 41 and to the inner surface of said frames or plates the reticulated sections 42 are secured and each fit edge to edge as shown in Fig. 5, when the "former" or mold is closed, said plates thereby constituting the mold. A frame 43 rests upon the frame 31 and is attached to a vertically movable rod 44 extending through the hopper 29 and the outlet pipe 30, and arranged to be engaged, when lowered, by a lever 45, by operation of which the inclosure formed by the plates 32 and the mold or "former" carried thereby may be raised above, and disengaged from, the hopper 29 as shown in Fig. 2. The bottom of the mold or "former" comprises a frame 46 similar to the frames 41 and a section 47 of reticulated material similar to the sections 42, and the edges thereof extending under the lower edges of the wall portions. Within the bottom plate 12 a series of passages 48 are formed communicating with the exterior by outlet passages 49 and with the chamber formed by the plates 32 through a frame 50. A frame or backing 51 similar to the frame 47 is attached to the frame 50 and supports a section 52 of reticulated material through which the water may be ejected into the passages 48. A pipe 53 for the admission of heated air or steam under pressure leads into the upper portion of the tank or container 2, and a pipe 54 for the supply of additional quantities of water, before and during the admission of the air and steam extends into the lower portion of said tank or container above the hopper 13 and is provided with a deflecting shield 55 whereby the entering water will be deflected effectively to stir and agitate the water in the container to hold the suspended materials in proper suspension and prevent coagulation or massing thereof prior to deposition against the walls of the "former."

In operating the machine to practice the present invention, the "former" or mold being in closed position and supported against the tank or container 2 as shown in Figs. 1 and 3, the water and suspended material are admitted through the hopper 8 and without pressure. A quantity thereof passes into and completely fills the mold or "former" and the water enters and fills the space surrounding the same, passing from the space through the smaller outlet 30. The flowing liquid deposits quantities of the fibrous and other materials against the interior surface of the "former" or mold, against the sides, top and bottom, in substantially equal thickness, thereby forming a matting whereby the materials following will be caught and uniformly and evenly matted and felted together. The tank or container being thus filled, heated air or superheated steam under pressure, is admitted through the pipe 53, at first to a low degree, and is gradually increased as the liquid is ejected, reaching its maximum about the time that the liquid ceases to pass into the mold. Before and during the admission of air or steam through pipe 53, such additional volumes of water as may be required are admitted through pipe 54. It will be noted that during the entire molding operation a jacket of water is maintained around the mold which prevents the ejected liquid and the pressure from forming holes or uneven places in the molded structure. The forcibly ejected air or steam carries away the adhering particles of moisture from the frame parts around the mold and forces outwardly the moisture with which the molded object was saturated, the air or steam which has taken up moisture being displaced by the relatively drier air or steam which is being admitted through the pipe 53. The continuing pressure of such air or steam compacts and dries the deposited pulp against the former. In this way a finished, evenly felted, and thoroughly dried object may be formed without the aid of mechanical pressure, and which may be of pure fiber or composed of fibrous elements mixed with other solidifying elements, such as cement. By using materials, such as cement and the like, objects may be produced capable of being polished or ground to smooth surfaces, while with the pure fiber strongly formed objects may be produced for ordinary use.

After the object has been formed and dried as described, the bars 17 are lowered, carrying downwardly and disengaging from the container 2 the mold and the object therein. By operation of the lever 45 the mold chamber may be raised and disengaged from the hopper 29 as shown in Fig. 2, at which time the hinged sections of the mold may be thrown apart and the finished, dried object removed.

I am aware that there may be modifications and alterations in the construction and arrangement of the parts embodying this invention without departure from the spirit and scope of the invention, and I do not restrict myself to identical features of construction or arrangement, but

What I claim and desire to secure by Letters Patent is—

1. The process of molding and drying pulp compositions at one operation, which consists in diffusing the particles thereof in sufficient water to allow each particle to float freely, causing primary flow through a "former" or mold effectively to deposit a relatively thin layer of the particles against said former or mold, and then depositing the remainder of the pulp against said layer by superheated steam introduced at a gradually increasing pressure which causes the remainder of the fluid to pass through said former or mold, and continuing the pressure of steam until all of the pulp composition so deposited has been dried, substantially as specified.

2. The combined process of molding and drying pulp compositions, which consists in arranging a perforated "former" in an incasement so as to cause the perforated surface to be submerged while the deposit is taking place, diffusing the pulp compositions in sufficient water to allow every particle to float freely and separately, causing a primary flow of the pulp bearing water to pass through said former effectively to deposit a relatively thin layer of the particles against said former and to submerge said former, then depositing the remainder of said particles against said layer by superheated steam introduced at a gradually increasing pressure, and continuing the pressure of said steam until the pulp has been dried, substantially as specified.

3. The process of shaping and drying articles of pulp and other ingredients by a single operation, which consists in diffusing the pulp and ingredients in enough water to float the particles freely, maintaining the ingredients and water at substantially unvarying heated temperature while the particles are being deposited on the "former", and forcing the ingredients against and the water through a perforated "former" by a continuing pressure of superheated steam, substantially as described.

4. The process of shaping and drying articles of pulp and commingled ingredients at one operation, which consists in arranging a perforated "former" within an incasement, maintaining the pulp and ingredients at substantially unvarying heat during the time that the deposit is taking place, depositing the pulp and ingredients against the "former" by a pressure of superheated steam, and continuing the pressure of superheated steam against the pressed surface of the pulp and ingredients after the deposit has taken place until the desired compactness and dryness are attained, substantially as described.

5. The herein described method of making articles, which consists in placing a mixture of pulp and other ingredients upon the mold or "former" of a pressure chamber, admitting an additional quantity of water into the chamber before the particles of the mixture have been settled, and admitting superheated steam under the desired pressure to the chamber to force the mixture against the mold or "former", and to remove moisture from the mixture, substantially as described.

6. The method of forming articles, which consists in placing a mixture of pulp and water upon the mold or "former" at the bottom of the chamber, admitting a quantity of water upwardly into said chamber, and then admitting superheated steam under pressure to the chamber above the water to deposit the pulp on the "former" and press the water out therethrough, substantially as specified.

7. The process of making articles which consists in forcing pulp and other ingredients against a supporting mold by a pressure of dry superheated steam, substantially as specified.

8. The process of shaping and drying articles of pulp and other ingredients which consists in forcing the pulp and other ingredients against supporting molds of suitable shape and dimensions by a pressure of superheated steam within a heated chamber.

9. The process of shaping and drying articles of pulp and other ingredients at one operation, which consists in placing the pulp and other ingredients upon a mold or "former" and within a heated chamber, maintaining the pulp and ingredients at substantially unvarying heated temperature before being deposited upon the mold or "former", admitting a quantity of water into the pulp and other ingredients while within the heated chamber and before the pulp and ingredients have settled, and admitting superheated steam into the heated chamber to force the pulp and ingredients against and the water through the mold or "former", substantially as described.

10. The method of shaping and drying articles of pulp and commingled ingredients, which consist in diffusing the pulp and ingredients in water and adjacent to a perforated "former", forcing the water through and depositing the pulp and ingredients upon the "former" by pressure of superheated steam, displacing the superheated steam which forces the water through the "former", and replacing the displaced superheated steam with additional and relatively drier superheated steam while the pressure against the deposited pulp and ingredients is continued.

11. The method of shaping and drying articles of pulp and other compositions at one operation, which consists in depositing the pulp and other compositions against a perforated "former" within an incasement by an aeriform agent, displacing the said aeriform agent which deposits the pulp compositions by relatively drier superheated steam, and compacting and drying the deposited pulp and ingredients against the "former" by the continuing pressure of the superheated steam, substantially as described.

12. The hereindescribed method of making articles, which consists in placing a mixture of pulp and other ingredients upon the "former" of a pressure chamber, admitting an additional quantity of water into said chamber before the particles of the mixture have settled, admitting superheated steam under increasing pressure to the chamber until the desired pressure is secured, and removing from the chamber the superheated steam first admitted and replacing the removed superheated steam by additional and relatively drier superheated steam under pressure, substantially as described.

13. The method of forming articles which consists in placing a mixture of pulp and water upon a former at the bottom of a chamber, admitting a quantity of water upwardly into said chamber in a direction away from said former, admitting superheated steam under pressure to the chamber above the water to deposit the pulp on the "former" and press the water out therethrough, removing from the chamber the superheated steam which deposits the pulp, and replacing the superheated steam so removed by other and relatively drier superheated steam while maintaining the pressure against the deposited pulp, substantially as described.

14. The process of molding and drying compositions at one operation, which consists in diffusing the compositions in sufficient water to allow each particle to float freely, causing primary flow through a "former" effectively to deposit a relatively thin layer of the particles against said "former," depositing the remainder of the composition against said layer by heating absorbent aeriform fluid applied under pressure, then displacing the aeriform fluid which effects the deposit aforesaid, and replacing the displaced aeriform fluid by additional relatively drier superheated steam applied under pressure.

15. The combined process of molding and drying compositions, which consists in arranging a perforated "former" in an incasement so as to cause the perforated surface to be submerged while the deposit is taking place, diffusing the compositions in sufficient water to cause the particles to float freely and separately, causing a primary flow of the composition-bearing water to pass through said "former" effectively to deposit a relatively thin layer of the compositions against said "former" and to immerse said "former," then depositing the remainder of said compositions against said layer by heated dry and absorbent aeriform fluid introduced at a gradually increasing pressure, displacing the saturated aeriform fluid, replacing the displaced aeriform fluid by other and relatively drier superheated fluid, and continuing the pressure of the superheated dry fluid until the compositions have been dried.

16. The process of shaping and drying articles of pulp and other ingredients at one operation, which consists in forcing the pulp and other ingredients in a wet condition against supporting molds of selected sizes and shapes by pressure of superheated steam, removing the superheated steam which forces the pulp and other ingredients against the molds, replacing the removed superheated steam by other relatively drier superheated steam, and increasing the pressure by the superheated steam until the desired compactness and dryness are attained, substantially as described.

Signed this 18th day of June, 1909.

JULIAN H. RIVERS. [L. s.]

Witnesses:
J. D. RIPPEY,
L. C. KINGSLAND.